United States Patent
Johann et al.

(10) Patent No.: US 11,957,999 B2
(45) Date of Patent: Apr. 16, 2024

(54) BACKFLUSHING FILTER

(71) Applicant: BWT Holding GmbH, Mondsee (AT)

(72) Inventors: Jürgen Johann, Nussloch (DE); Anton Mairhofer, Zell am Moos (AT)

(73) Assignee: BWT Holding GmbH, Mondsee (AT)

( * ) Notice: Subject to any disclaimer, the term of this patent is extended or adjusted under 35 U.S.C. 154(b) by 113 days.

(21) Appl. No.: 16/314,286

(22) PCT Filed: Jul. 3, 2017

(86) PCT No.: PCT/EP2017/066532
§ 371 (c)(1),
(2) Date: Jan. 11, 2019

(87) PCT Pub. No.: WO2018/002384
PCT Pub. Date: Jan. 4, 2018

(65) Prior Publication Data
US 2019/0201818 A1   Jul. 4, 2019

(30) Foreign Application Priority Data

Jul. 1, 2016 (EP) .................................... 16177668

(51) Int. Cl.
*B01D 29/62* (2006.01)
*B01D 29/23* (2006.01)
(Continued)

(52) U.S. Cl.
CPC .......... *B01D 29/682* (2013.01); *B01D 29/23* (2013.01); *B01D 29/66* (2013.01); *B01D 29/688* (2013.01);
(Continued)

(58) Field of Classification Search
CPC .... B01D 29/682; B01D 29/23; B01D 29/688; B01D 2201/082; B01D 2201/29;
(Continued)

(56) References Cited

U.S. PATENT DOCUMENTS

| | | | |
|---|---|---|---|
| 6,200,467 B1* | 3/2001 | Nagaoka ................ | B01D 29/15 210/136 |
| 2003/0136715 A1* | 7/2003 | Rott ...................... | B01D 29/117 210/411 |

(Continued)

FOREIGN PATENT DOCUMENTS

| CN | 1583215 A | 2/2005 |
|---|---|---|
| CN | 1887401 A | 1/2007 |

(Continued)

OTHER PUBLICATIONS

Machine-generated English translation of IT-1235896B, generated on Jan. 23, 2024.*

*Primary Examiner* — Fred Prince
(74) *Attorney, Agent, or Firm* — Smartpat PLC

(57) ABSTRACT

A backflushing filter having an inlet, an outlet, and a drain; a filter that divides a housing into an inlet chamber that is connected to the inlet and an outlet chamber that is connected to the outlet; a backflushing device having a suction element arranged so that it is able to rotate around the filter on the inlet side of the housing with at least one suction opening that is oriented in the suction direction toward the filter for filter-cleaning purposes; a backflushing duct connected to a suction opening and the drain; and a rotating device which drives the rotational movement of the suction element around the filter when a pressure drop occurs in the backflushing duct; wherein when the pressure drop in the backflushing duct occurs, the rotating device drives the rotational movement of the suction element by the suction direction of the suction opening that is inclined relative to the radial direction of the suction element.

21 Claims, 6 Drawing Sheets

(51) Int. Cl.
  *B01D 29/66* (2006.01)
  *B01D 29/68* (2006.01)
(52) U.S. Cl.
  CPC .... *B01D 2201/082* (2013.01); *B01D 2201/29* (2013.01); *B01D 2201/583* (2013.01)
(58) Field of Classification Search
  CPC ............ B01D 2201/583; B01D 29/117; B01D 29/6476; B01D 2201/02; B01D 2201/0415; B01D 2201/08; B01D 2201/16; B01D 2201/34; B01D 2201/58; B01D 2265/06; B01D 2271/00; B01D 29/232; B01D 29/60; B01D 29/62; B01D 29/684; B01D 29/902; B01D 29/904; B01D 29/94; B01D 35/147; B01D 35/26; B01D 46/0064; B01D 24/004; B01D 24/005; B01D 24/14; B01D 24/42; B01D 24/4636; B01D 2201/084; B01D 21/0012; B01D 21/0045; B01D 21/01; B01D 21/02; B01D 21/2427; B01D 21/2438; B01D 21/34; B01D 25/26; B01D 25/30; B01D 25/307; B01D 25/327; B01D 29/15; B01D 29/33; B01D 29/46; B01D 29/6446; B01D 29/885; B01D 29/90; B01D 29/908; B01D 33/073; B01D 33/275; B01D 33/463; B01D 33/503; B01D 33/727; B01D 36/00; B01D 37/03; B01D 46/0069; B01D 29/52; B01D 29/114; B01D 29/68; B01D 29/66; B01D 29/11; C02F 1/001; C02F 1/008; C02F 2201/005; C02F 2303/16; C02F 1/24; F02M 37/34; F02M 37/38; B03B 13/00; B03D 1/028; B03D 1/1406; B03D 1/1412; B03D 1/1431; B03D 1/1462; B03D 1/1475; B03D 1/1493; A47L 9/20; A47L 9/10
  USPC ...................... 210/411, 408, 416.1, 791, 796
  See application file for complete search history.

(56) References Cited

U.S. PATENT DOCUMENTS

| | | | |
|---|---|---|---|
| 2009/0001027 A1* | 1/2009 | Carew | B01D 29/15 |
| | | | 210/416.1 |
| 2010/0065489 A1* | 3/2010 | Schrempf | B01D 33/48 |
| | | | 210/393 |
| 2013/0087495 A1 | 4/2013 | Riggers | |
| 2014/0299527 A1 | 10/2014 | Lee et al. | |
| 2015/0196859 A1* | 7/2015 | Levitt | B01D 29/6476 |
| | | | 210/435 |

FOREIGN PATENT DOCUMENTS

| | | | | |
|---|---|---|---|---|
| CN | 104128032 A | | 11/2014 | |
| DE | 8438010 U1 | | 4/1986 | |
| DE | 4343180 A1 | * | 6/1995 | ........... B01D 29/684 |
| DE | 4343180 A1 | | 6/1995 | |
| DE | 29809202 U1 | | 7/1998 | |
| EP | 2767317 A1 | | 8/2014 | |
| EP | 3213803 A1 | * | 9/2017 | ............ B01D 29/92 |
| GB | 1485989 A | | 9/1977 | |
| IT | 1235896 B | * | 11/1992 | ........... B01D 29/114 |
| RU | 2553901 C2 | | 6/2015 | |
| SU | 1724316 A1 | | 4/1992 | |

* cited by examiner

BACKFLUSHING FILTER

FIELD OF THE INVENTION

The invention relates to a backflushing filter. The backflushing filter has a housing with an inlet, an outlet, and a drain. A filter element divides the housing an inlet chamber that is connected to the inlet and an outlet chamber that is connected to the outlet. A backflushing device that has a suction element—is arranged so that it is able to rotate around within the filter on the inlet side of the housing. At least one suction opening is oriented in a suction direction toward the filter element for filter-cleaning purposes. A backflushing duct is connected to the suction opening and the drain. The backflushing device operates as a rotating device and causes a rotational movement of the suction element within the filter when a pressure drop occurs in the backflushing duct.

BACKGROUND OF THE INVENTION

In order to facilitate the cleaning of a filter cartridge of a backflushing filter when the backflushing filter is being backflushed, it is known from the prior art (DE4343180A1) for a pressure drop in the backflushing duct during the backflushing to be used to produce a rotation of a suction element with a suction opening around the filter cartridge and thus to suction off dirt particles from the filter surface. This is structurally attained by means of a rotating device, which—similarly to a worm gear screw jack—drives the suction element to rotate by means of a piston that is provided in the backflushing duct and a drive spindle that is mechanically coupled to the piston. In this connection, it is disadvantageous that the rotational movement is limited by the maximum stroke of the piston of the suction element—which limits the cleaning action of the suction element, particularly with regard to dirt particles that adhere comparatively firmly to the filter cartridge. As a result, despite the backflushing function in the backflushing filter, it is not possible to insure a substantial cleaning of the filter cartridge—which disadvantageously requires an increased maintenance expense for the backflushing filter with regard to its filter cartridge.

SUMMARY OF THE INVENTION

The object of the invention, therefore, is to modify the design of a backflushing filter of the type explained at the beginning such that it is always possible to insure a sufficient cleaning of dirt particles from the filter during the backflushing. The backflushing filter should also be easy to operate and maintain.

The invention attains the stated object in that when the pressure drop in the backflushing duct occurs, the rotating device drives the rotational movement of the suction element by means of the suction direction of the suction opening that is inclined relative to the radial direction of the suction element.

If, when the pressure drop in the backflushing duct occurs, the rotating device drives the rotational movement of the suction element by means of the suction direction of the suction opening that is inclined relative to the radial direction of the suction element, then by contrast with the prior art, the filter suction of the suction element can be maintained over the entire duration of the pressure drop and backflushing. The vacuum in the backflushing duct acts on the suction element with a reaction force, specifically by means of the suction direction that is aimed according to the invention, which acts on the rotational position of the suction element—and therefore provides a rotation of the suction element around the filter. It is therefore possible to insure a cleaning of dirt particles from the filter that is improved in comparison to the prior art. This filter cleaning can also be adjusted according to the degree of soiling in a relatively simple way over the duration of the backflushing, which permits a comparatively simple embodiment of the backflushing and thus also of the operation of the backflushing filter. In particular, however, the invention excels relative to the prior art in that because of the continuous suction of the suction element during the entire duration of the backflushing, even stubbornly adhering dirt particles can be suctioned from the filter, thus making it possible to continuously insure the filter function in the backflushing filter. This not only reduces the maintenance cost of the backflushing filter, but also especially extends the life of the backflushing filter according to the invention.

If the suction opening is embodied as slot-shaped, then the filter suction can include a larger longitudinal segment of the filter casing, but still provide a sufficient flow speed at the filter surface in order to achieve particularly good and reliable suction results.

If the longitudinal slot axis of the suction opening is inclined relative to the longitudinal axis of the suction element, then the result of the suction at the filter can be further improved. In this way, it is specifically possible, by means of the inclined orientation of the suction opening, for the dirt particles, which have in fact been detached by a first section of the suction opening, but not suctioned away, to be suctioned away by a second section of the suction opening that follows this first section. It is thus possible to prevent dirt particles from re-adhering to the filter casing until the time that the next suctioning of this filter casing region takes place. According to the invention, it is thus possible for even stubbornly adhering dirt particles to be cleaned from the filter, which yields a particularly long-lived backflushing filter.

Alternatively to a suction opening in the form of a slot, it is also possible for the suction element to have, extending along it, at least one row of suction openings arranged one after another and spaced apart from one another in order to be able to suction dirt particles from the filter with an increased flow speed.

This suction can be further improved if the suction element has two diametrically opposed rows whose suction openings are arranged in gaps relative to one another.

If the suction element and the filter are arranged coaxially to each other, then—because of the comparatively shorter backflushing duct lengths—a comparatively high suction power at the suction element can be achieved and the suction results can thus be further improved.

The design of the suction element can be simplified if the backflushing duct has a middle central duct in the suction element and at least one side duct that is connected to the middle central duct, is inclined relative to the radial direction of the suction element, and ends at the suction opening. Furthermore, by means of the middle central duct in the suction element, it is possible to avoid having the longitudinal flow through the suction element counteract the reaction force for the rotation of the suction element—which can insure a reliable rotation of the suction element even when there are comparatively low pressure differences during the backflushing.

A turbulent suction flow in the side duct of the suction element can be avoided or reduced if the side duct has opposing curved guide surfaces that end at the suction opening. It is thus possible, among other things, to increase the reaction force of the suction flow on the suction element, which further improves the driving action of the rotating device.

Because the cross-sectional area of the central duct widens out, this can offer the possibility of adjusting the suction power over the entire length of the suction opening in order to achieve reliable suction results at the filter. In particular, it is thus possible, among other things, to set a uniform suction power over the entire length of the suction opening.

If the suction element has at least one blade, then it can be embodied in the form of a blade impeller and can thus exert an assisting action on the rotation of the suction element. It is thus possible—by increasing the driving force—to further improve the rotating device and thus reliably insure a cleaning of the filter even when there are low pressure differences in the backflushing duct.

An increased combinatory effect for the driving of the suction element by the aimed suction flow of the suction element and the impeller properties of the suction element can be achieved if the blade has the suction opening at its blade edge. The aimed suction flow at the blade edges can specifically avoid turbulence there that would slow the rotational movement, which turbulence can be caused when the water pressure remains the same between the inlet and outlet during the transfer of kinetic energy to the suction element. Based on the consequently reduced rotational resistance at the suction element, the function of the suction can be embodied in a significantly more reliable way—which insures a particularly substantial cleaning of the filter according to the invention.

The above-mentioned assistance of the rotational movement due to the outer geometry of the suction element can be further improved if the blade is forward-curved.

If the blade contour of the blades varies in the longitudinal direction of the suction element, then it is possible to further improve the impeller properties of the suction element.

The design of the backflushing filter can be additionally simplified if the suction element is arranged so that it is able to rotate freely in the backflushing filter.

According to the invention, not only can impurities travel into the backflushing duct via the suction opening or suction openings aimed at the filter, but also a comparatively high suction action can develop at the bottom of the inlet chamber. This can be achieved in that the suction element is supported so that it is able to slide axially in the backflushing filter from a filter operating position into a backflushing position and the backflushing filter has an outlet opening that is connected to the backflushing duct and that on the one hand, is open in the filter operating position of the suction element and on the other hand, is closed in the backflushing position of the suction element, which is axially shifted relative to the filter operating position. It is thus possible to insure a rapid and substantial cleaning of the filter. In addition, this axial movement can be used to open and close the outlet opening. It is thus possible to simplify the design and extend the life of the backflushing filter.

This opening and closing of the first outlet opening with the aid of the axial sliding of the suction element can be enabled if, in addition to the suction opening, the first suction element has the first outlet opening that is connected to the backflushing duct and is positioned relative to the bottom of the inlet chamber in such a way that on the one hand, in the filter operating position, the first outlet opening is positioned at least partially above the bottom of the inlet chamber and is thus open relative to the inlet chamber and on the other hand, in the backflushing position that is axially shifted relative to the filter operating position, the first outlet opening is positioned below the bottom of the inlet chamber and is thus closed relative to the inlet chamber.

Alternatively to a first outlet opening in the suction element, this opening and closing of the outlet opening with the aid of the axial sliding of the suction element can be enabled if the second outlet opening is formed between the second suction element and a bottom of the inlet chamber and in the backflushing position that is axially shifted relative to the filter operating position, the second suction element rests against the bottom and thus closes the second outlet opening.

If the suction element is supported so that it is able to slide axially in the backflushing filter in opposition to a restoring spring, then it is possible in a stable fashion to insure a return of the suction element from its backflushing position into its filtering position.

BRIEF DESCRIPTION OF THE DRAWINGS

In the figures, the subject of the invention is shown in greater detail by way of example based on several embodiment variants. In the drawings.

DETAILED DESCRIPTION OF THE PREFERRED EMBODIMENTS

Figure 1:
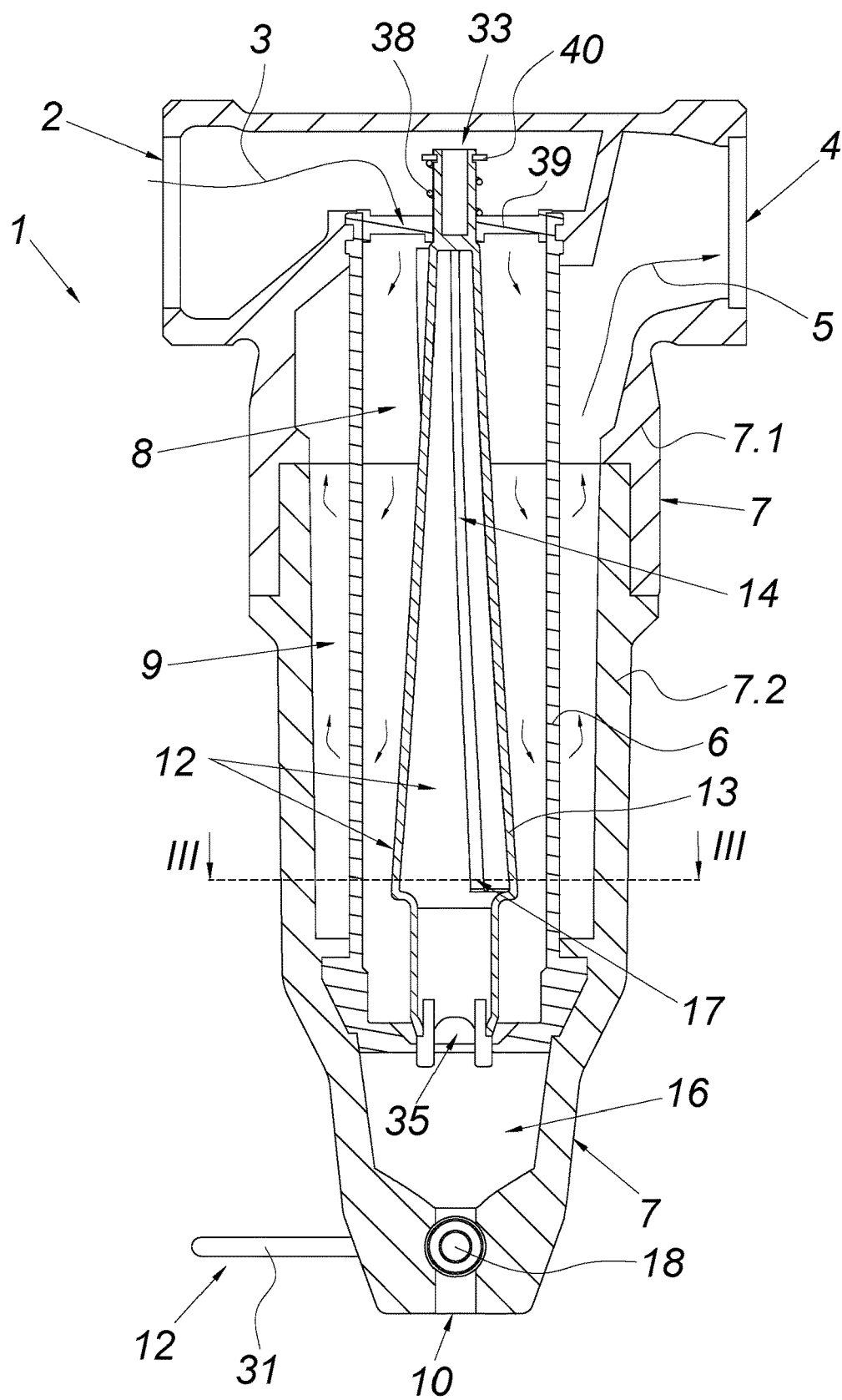
FIG. 1 is a sectional side view of a first backflushing filter during the filter operation.

In the backflushing filters 1 and 101 shown in FIGS. 1, 2, 5, and 6, an inlet 2 for the liquid 3 to be filtered, in particular drinking water, and an outlet 4 the filtered liquid 5 are visible. In order to filter the liquid 3, a cartridge-shaped filter 6, 106 is provided in the backflushing filter 1 or 101 and divides the housing 7 of the backflushing filter 1, 101 into an inlet chamber 8 that is connected to the inlet 2, and an outlet chamber 9 that is connected to the outlet 4. The housing 7 of the backflushing filter 1, 101 is composed of an upper part 7.1 and a filter housing 7.2 that can be detached from the upper part 7.1.

Figure 2:
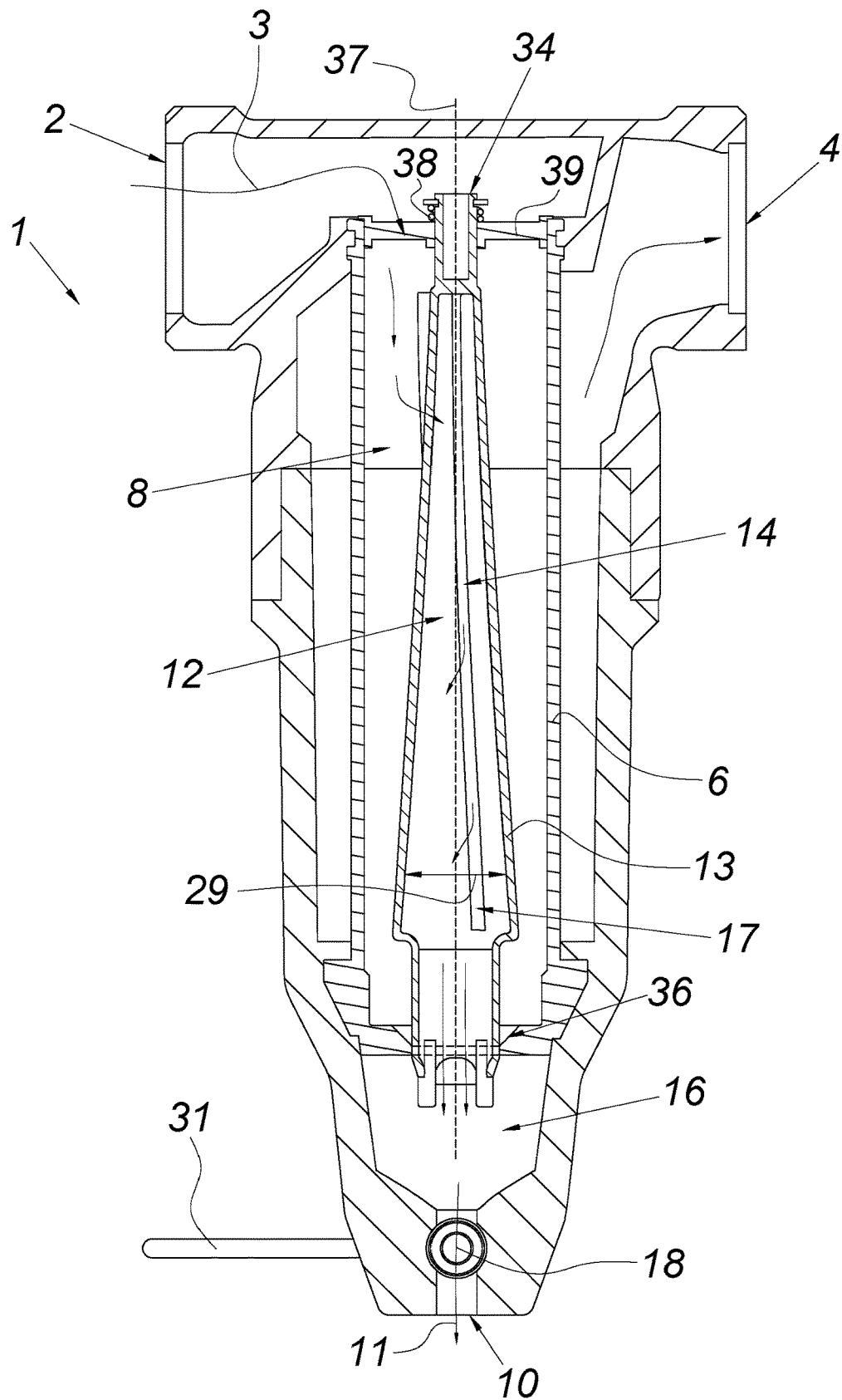
FIG. 2 is a sectional side view of the backflushing filter shown in FIG. 1 during the backflushing.
Figure 3:
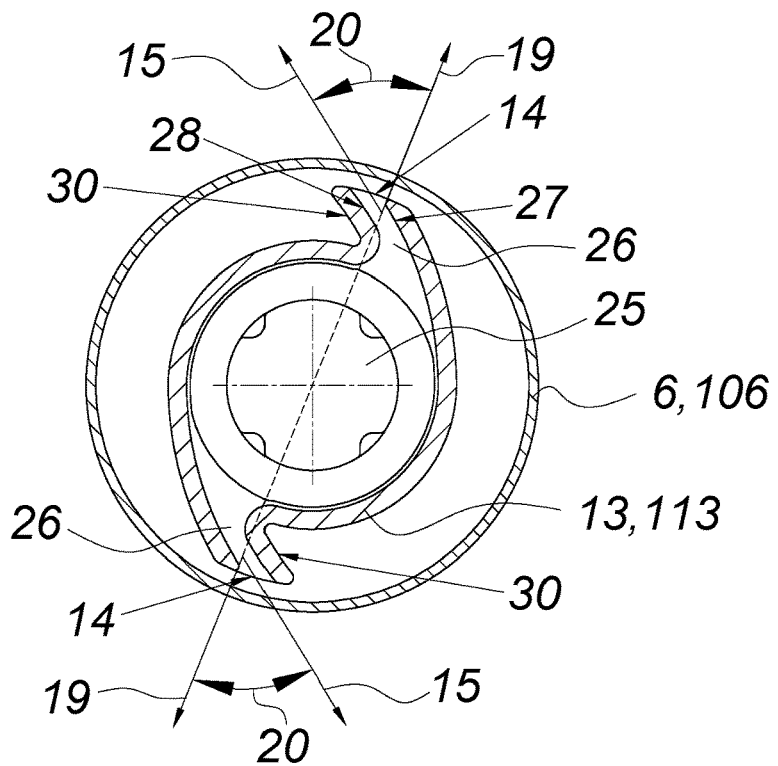
FIG. 3 shows a side view according to the cutting line III-III in FIG. 1 and FIG. 4.
Figure 5:
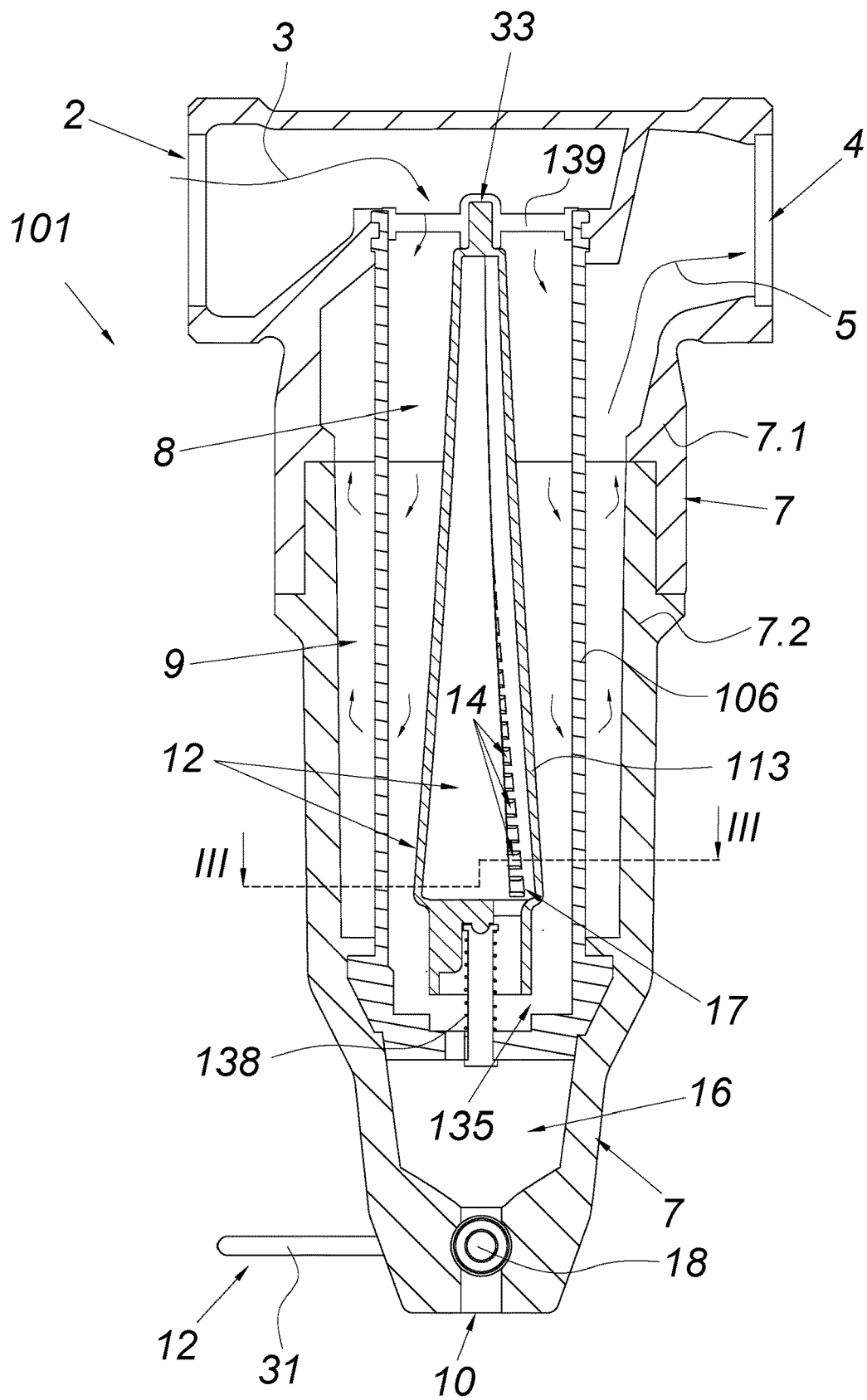
FIG. 5 is a sectional side view of a second backflushing filter during the filter operation.
Figure 6:
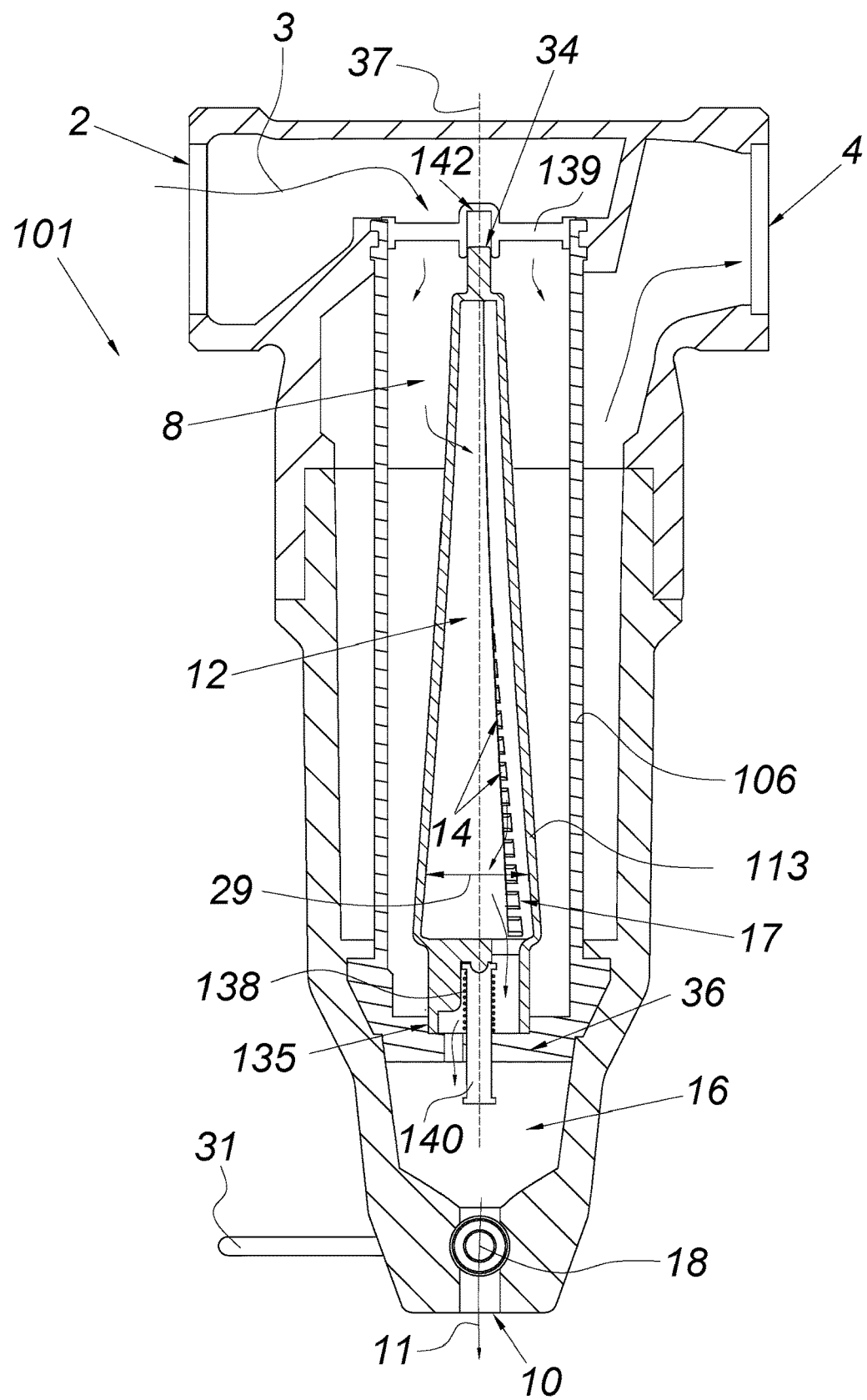
FIG. 6 is a sectional side view of the backflushing filter shown in FIG. 5 during the backflushing.

According to FIG. 2, for the backflushing of the backflushing filter 1, 101, it is equipped with a drain 10 and the liquid 11 that is to be conveyed away in FIG. 2 and FIG. 6, together with any dirt particles—which are not shown in detail—can be conveyed away via this drain 10. This liquid 11 that is to be conveyed away is removed from the backflushing device 12 in the region of the inlet chamber 8, for which purpose the backflushing device 12 has, among other things, a suction element 13 or 113 in the inlet chamber 8. This suction element 13 or 113 is able to rotate, preferably freely, within the filter 6, 106 and has multiple suction openings 14, which are aimed in the suction direction 15 at the filter 6, 106 for filter cleaning, as is shown in FIG. 3 for the first suction element 13 of the first backflushing filter 1, in a complete section according to the cutting line III-III, perpendicular to its longitudinal axis. This FIG. 3 is also applicable to the second suction element 113 of the second backflushing filter 101 with a bent sectional course according to the cutting line III-III in FIG. 5. During backflushing, liquid 11 flows from the inlet chamber 8 through the suction openings 14 of at least one inclined side duct 26 into a central duct 25 of the suction element 13 or 113 and further to the drain 10.

These suction openings 14 are fluidically connected to the drain 10 via a backflushing duct 16 of the backflushing device 12. The backflushing device 12 is also associated with a rotating device 17 that can be used to drive the suction element 13, 113 to rotate—namely by using a pressure drop in the backflushing duct 16, which pressure drop occurs during the backflushing in the backflushing duct 16 when the backflushing valve 18 is opened by means of the actuating lever 31.

According to the invention, the rotational movement of the suction element 13, 113 is produced by the rotating device 17 in that the suction directions 15 of the suction openings 14 are inclined relative to the radial direction 19 of the suction element 13, 113—as is apparent in FIG. 3 based on the inclination angle 20 between the suction directions 15 and the radial directions 19 in the horizontal direction or in a horizontal plane. By means of these oriented suction directions 15, a reaction moment can be generated, which acts on the suction elements 13, 113, thus setting the suction element 13, 113—which is supported so that it is able to rotate freely in the backflushing filter 1, 101—into rotation. The force directions or suction directions 15 of the liquid 11 that is conveyed out of the inlet chamber 8 via the suction openings 14 specifically do not intersect with the longitudinal axis 37 around which the suction element 13, 113 rotates, but are offset, for example by 50 degrees relative to the radial direction 19, as a result of which a torque acts on the suction element 13, 113. By contrast with the prior art, it is therefore not necessary to provide a mechanical transmission for the drive of the suction element 13, 113—which transmission is on the one hand, structurally complex and on the other, subject to an increased risk of soiling due to its position in the backflushing duct 16. This significantly increases the ease of maintenance and functional reliability as compared to the prior art.

Figure 4:
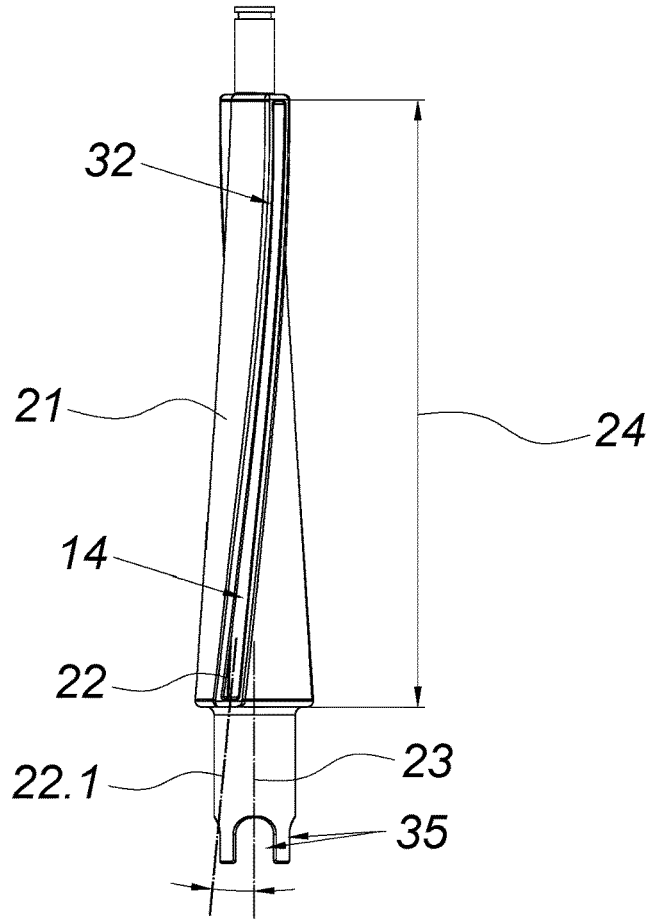
FIG. 4 shows a side view of a first suction element of the first backflushing filter.

As can be inferred particularly from FIG. 4, the suction openings 14 of the first suction element 13 are slot-shaped or embodied in the form of a slot 22 and extend helically in the casing 21 of the first suction element 13. This produces an inclined orientation of the longitudinal slot axis 22.1 of the suction opening 14 relative to the longitudinal axis 23 of the first suction element 13—which can improve the suction at the filter 6, particularly if stubbornly adhering dirt particles are to be suctioned from the filter 6. As is also shown in FIG. 4, this inclined orientation of the longitudinal slot axis 22.1 extends over the entire length 24 of the suction opening 14. The two slot-shaped suction openings 14 or slots 22 are also positioned diametrically opposite from each other on the first suction element 13.

Figure 7:
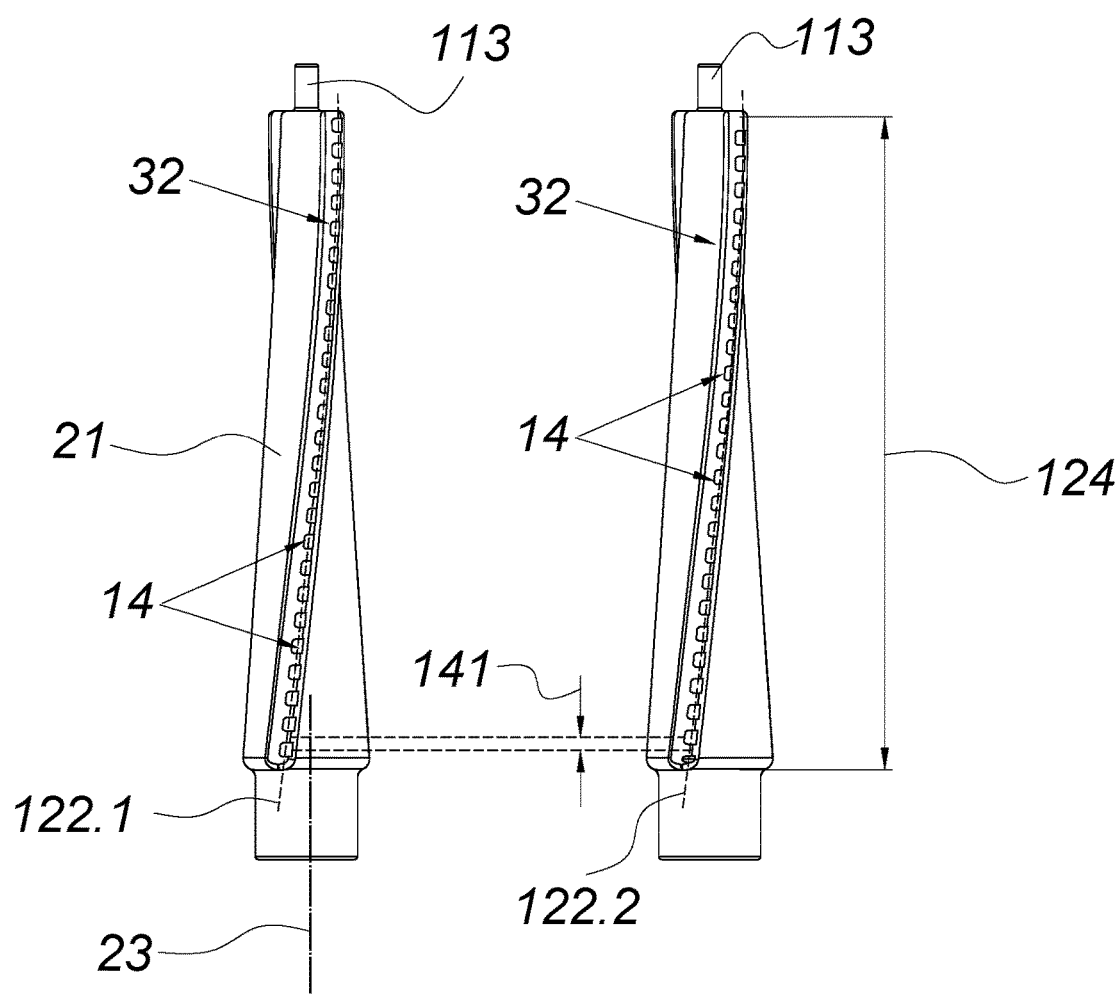
FIG. 7 shows a side view of a second suction element of the second backflushing filter.

The second suction element 113, which is shown in a front and rear view in the detail according to FIG. 7, unlike the suction element 13 shown in FIG. 4, has multiple rows 122.1 and 122.2 of suction openings 14, which are arranged one after another and are spaced apart from one another.

As is also shown in FIG. 7, over their entire length 124, the rows 122.1 and 122.2 extend in an inclined orientation relative to the longitudinal axis 23 of the second suction element 13.

The suction openings 14 of the two diametrically opposed rows 122.1, 122.2 are also arranged in gaps 141 relative to one another, which makes it possible for dirt particles to be broken away from the filter 106 in a particularly favorable way.

For a simply designed embodiment, the suction element 13, 113 is positioned coaxially in the filter 6, 106, as can be seen, for example, in FIG. 2 or 4—This coaxial arrangement can also insure a particularly uniform cleaning of the filter 6, 106.

In the suction element 13, 113, the backflushing duct 16 has a middle central duct 25 and multiple side ducts 26 that are connected to the middle central duct 25, which is shown in greater detail in FIG. 3. The side ducts 26 extend in an inclined fashion relative to the radial direction 19 of the suction element 13, 113 and each of them ends at the respective suction opening 14. Because these side conduits 26 are positioned opposite each other and have curved guide surfaces 27, 28, each of which ends at a suction opening 14, it is possible to produce a nozzle-shaped suction jet in the suction directions 15, which additionally increases the driving force for the rotation of the suction element 13, 113.

The central duct 25 widens out in its cross-sectional area 29 in the longitudinal direction—namely in that its cross-sectional area 29 becomes larger in the direction of the drain 10. This achieves a uniform suction over the entire suction opening 14.

The suction element 13, 113 also has two forward-curved blades 30 in order to embody the suction element 14 as a bladed wheel, as is apparent in FIG. 3. In this way, the suction element 13, 113 can, like a constant-pressure turbine, also extract kinetic energy in the flow path between the inlet 2 and the outlet 4 and can use it to drive the rotational movement of the suction element 13. Consequently, even in the event of a low withdrawal of filtered liquid 5 (which is depicted with dashed lines in FIG. 2) as the outlet 4 and thus a comparatively low pressure difference, the rotation of the suction element 13, 113 and thus a functional suction of the filter 6, 106 is retained.

As is apparent from FIG. 4, the two blades 30 each have a respective suction opening 14 at their blade edge 32 that avoids turbulence at these locations, which would exert a slowing action, and thus facilitates the rotation of the suction element 13, 113. In addition, the blade contour of the blade 30 varies in the longitudinal direction of the suction element 13, 113.

Furthermore, a comparison between FIG. 1 and FIG. 2 and between FIG. 5 and FIG. 6 reveals that the suction element 13, 113 in the backflushing filter 1 is supported so that it can be slid axially from a filter operating position 33 into a backflushing position 34, namely axially along the longitudinal axis 37 around which the suction element 13 is also supported in rotary fashion. Since the suction element 13, 113 is supported so that it is able to slide axially in the back flushing filter 1 in opposition to a restoring spring 38, 138, after the back flushing filter 1 has been backflushed, the suction element 13 can also be moved in a structurally simple, stable fashion from the backflushing position 34 back into the filter operating position 33.

According to FIGS. 1 and 2, the seat of the compression restoring spring 38 is formed between the open filter cover 39 of the filter 6 and a washer 40 that is inserted into the first suction element 13.

According to FIGS. 5 and 6, the seat of the compression restoring spring 138 is formed between the bottom 36 of the inlet chamber 8 and a guide rod 140, which is supported in the bottom 36 in linear sliding fashion. The open filter cover 139 in this case forms a socket 142 as a counter-bearing of the bolt-shaped end of the suction element 113.

By means of this ability to slide axially, it is also possible to open or close an outlet opening 35, 135, which is required for a rapid, substantial cleaning of the filter 6, 106.

According to the first exemplary embodiment, first outlet openings 35 are connected to the backflushing duct 12 and are positioned relative to the bottom 36 of the inlet chamber 8 in such a way that on the one hand, in the filter operating position 33, these first outlet openings 35 are positioned above the bottom 36 of the inlet chamber 8 and are thus open relative to the inlet chamber 8 and on the other hand, in the backflushing position 12 that is axially shifted relative to the filter operating position 33, these outlet openings 35 are positioned below the bottom 36 of the inlet chamber 8 and are thus closed relative to the inlet chamber 8. Thus at the beginning of the backflushing, impurities can already be conveyed away into a pressure chamber beneath the inlet chamber 8—which protects the suction openings 14 from becoming clogged with larger-sized impurities.

According to the second exemplary embodiment, the second outlet opening 135 is formed between the second suction element 113 and the bottom 36 of the inlet chamber 8—for this purpose, the second suction element 113 is spaced apart from the bottom 36 in its filter operating position 33. In the backflushing position 34 that is axially shifted relative to the filter operating position 33, the second suction element 113 rests against the bottom 36, which closes the second outlet opening 135.

The invention claimed is:

1. A backflushing filter, comprising:
   a housing, comprising
      an inlet,
      an outlet, and
      a drain;
   a filter element that divides the housing into
      an inlet chamber formed inside the filter element, the inlet chamber being connected to the inlet and
      an outlet chamber surrounding the inlet chamber, the outlet chamber being connected to the outlet;
   a suction element rotatably arranged in the inlet chamber inside the filter element, the suction element comprising
      a central duct and
      at least one inclined side duct; and
   a backflushing duct connected to the suction element and the drain,
   wherein during backflushing liquid flows through the at least one inclined side duct into the central duct and thereby causes the suction element to rotate.

2. The backflushing filter according to claim 1, wherein the at least one inclined side duct has a helical shape.

3. The backflushing filter according to claim 1, wherein the suction element has, extending along an outer end of the at least one inclined side duct, at least one row of suction openings arranged one after another and spaced apart from one another.

4. The backflushing filter according to claim 3, wherein the suction element has two diametrically opposed inclined side ducts whose suction openings are arranged in gaps relative to one another.

5. The backflushing filter according to claim 1, wherein the suction element and the filter element are arranged coaxially to each other.

6. The backflushing filter according to claim 1, wherein the at least one inclined side duct has opposing curved guide surfaces that end at a suction opening.

7. The backflushing filter according to claim 1, wherein a cross-sectional area of the central duct widens out in a direction of the drain.

8. The backflushing filter according to claim 1, wherein the suction element has at least one blade.

9. The backflushing filter according to claim 8, wherein the at least one blade has at least one suction opening at its blade edge.

10. The backflushing filter according to claim 8, wherein the at least one blade is forward-curved.

11. The backflushing filter according to claim 8, wherein a contour of the at least one blade varies in a longitudinal direction of the suction element.

12. The backflushing filter according to claim 1, wherein the suction element is arranged so that the suction element is able to rotate freely in the backflushing filter.

13. The backflushing filter according to claim 1,
   wherein the suction element is axially displaceable between a filter operating position and a backflushing position,
   wherein the backflushing filter has an outlet opening that is connected to the backflushing duct,
   wherein the outlet opening is open to the inlet chamber in the filter operating position of the suction element and closed to the inlet chamber in the backflushing position of the suction element.

14. The backflushing filter according to claim 13,
   wherein the suction element has an outlet opening that is connected to the backflushing duct and is positioned relative to a bottom of the inlet chamber in such a way that, in the filter operating position, the outlet opening is positioned at least partially above the bottom of the inlet chamber and is thus open relative to the inlet chamber and, in the backflushing position that is axially shifted relative to the filter operating position, the outlet opening is positioned below the bottom of the inlet chamber and is thus closed relative to the inlet chamber.

15. The backflushing filter according to claim 13, wherein the outlet opening is formed between the suction element and a bottom of the inlet chamber and in the backflushing position that is axially shifted relative to the filter operating position, the suction element rests against the bottom and thus closes the outlet opening.

16. The backflushing filter according to claim 13, wherein the suction element is supported so that the suction element is able to slide axially in the backflushing filter in opposition to a restoring spring.

17. The backflushing filter according to claim 13, wherein the suction element is supported so that the suction element is able to slide axially in the backflushing filter in opposition to a restoring spring.

18. The backflushing filter according to claim 1,
   wherein the filter element is a cylindrical body, and
   wherein the suction element includes a slot that extends axially proximal to the inside of the cylindrical body.

19. The backflushing filter according to claim 1,
   wherein the housing comprises
      an upper part including the inlet and the outlet, and
      a filter housing including the drain, the filter housing being detachably mounted to the upper part.

20. The backflushing filter according to claim 19, wherein the inlet and the outlet are arranged coaxially.

21. The backflushing filter according to claim 1,
   wherein the filter element is a cylindrical body extending along a filter axis, and wherein the suction element is arranged in and configured to rotate around the filter axis.

* * * * *